June 6, 1967  C. H. BUTTS  3,323,763
MOTOR MOUNTING RINGS

Filed March 29, 1965  2 Sheets-Sheet 1

INVENTOR
CHARLES H. BUTTS
by Albert L. Jeffers
ATTORNEY

June 6, 1967    C. H. BUTTS    3,323,763
MOTOR MOUNTING RINGS
Filed March 29, 1965    2 Sheets-Sheet 2

INVENTOR
CHARLES H. BUTTS
by Albert C. Jeffers
ATTORNEY

United States Patent Office 3,323,763
Patented June 6, 1967

---

3,323,763
MOTOR MOUNTING RINGS
Charles H. Butts, Fort Wayne, Ind., assignor to Tri-State Products, Inc., Fort Wayne, Ind., a corporation of Indiana
Filed Mar. 29, 1965, Ser. No. 443,500
6 Claims. (Cl. 248—15)

This invention relates to a mounting for motors and more particularly, to an improved resilient mounting for motors and the like which serves to cushion at least a part of the vibratory forces which occur from operation of the motor. From the standpoint of noiseless operation and also for protecting the working parts of the motor, it is important to suspend the motor by cushioned means, which will permit greater service life to the motor and will also reduce the tendency of the motor to generate objectionable noises.

One of the principal objects of the present invention is to provide a mounting which is a moldable one-piece construction adapted for economical production and use.

Another object of the present invention is to provide a new and improved motor mounting comprised of resilient mounting means disposed between the motor and a fixed structure and which will effectively dampen both noise and vibratory forces in order to insure a more quiet motor operation.

Other and further objects of the present invention will become apparent from a consideration of the following description, which proceeds with reference to the accompanying drawings, wherein.

Figure 1:
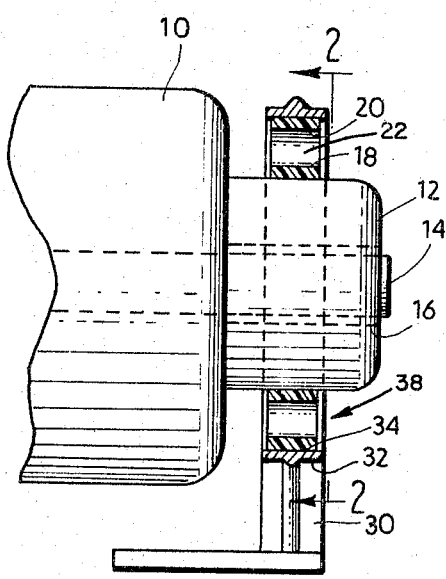
FIGURE 1 is a fragmentary side view partially in section showing a motor and the associated mounting structure incorporating the present invention therein.
Figure 2:
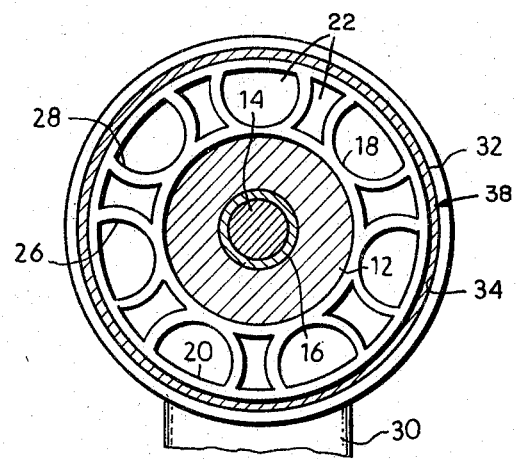
FIGURE 2 is a sectional view taken on line 2—2 of FIGURE 1.

Referring now to the drawings, and particularly to FIGURES 1 and 2, there is illustrated a motor 10 having a mounting hub 12 and an internal rotatable axle 14 which is mounted on a bearing 16. The hub 12 is passed through the inner member 18 of a pair of annular members 18 and 20 which are concentric (FIGURE 2) with respect to each other.

The concentric annular members 18 and 20 provide an annular spacing 22 therebetween and are joined by a number of circumferentially spaced pairs of connecting members 26, 28 which are joined at their opposite ends to the confronting surfaces of the concentric annular members 18 and 20 respectively.

The connecting members 26 and 28 are curvilinear and they are of substantially the same width (FIGURE 1) as the width of the inner and outer concentric members 18 and 20. The connecting members 26 and 28 are curved, the better to resist any tendency for the inner concentric member 18 to rotate in either direction relatively to the outer concentric member 20 and also to resist any twisting or turning of either of the concentric members 18 and 20 relatively to each other. Therefore, the hub 12 is maintained in a proper operative position at all times.

The connecting members 26 and 28 are the medium through which supportive loads and vibratory forces are communicated between the motor 10 and the fixed mounting structure 30 which may take the form of any suitable bracket having a mounting ring 32 with an opening 34 proportioned to receive the outer annular concentric member 20 therein.

The motor is thus supported by a fixed structure through the medium of the concentric members 18, 20 and the connecting members 26, 28.

The bracket 30 supports the motor 10 through the hub 12 through the agency of the mounting structure, designated generally by reference numeral 38 in FIGURE 2.

One of the important features of the mounting structure 38 is that it will resiliently absorb vibratory forces which are normally a part of motor operation and will thereby dampen both noise and vibrations between the bracket 30 and the motor 10. Consequently, the motor is not only more free of noise but also its service life is extended because destructive vibratory forces are effectively dampened.

In order to produce a resilient mounting, the mounting structure 38 consists, preferably, of a suitable plastic material such as nylon, or other moldable material having the necessary shock resistance, strength, durability and resistance to aging so it will not in time become brittle or tend to deteriorate.

One of the reasons why the plastic material tends to effect a damping of both vibration and noise is that the connecting members 26 and 28 are resilient and serve as a plurality of spaced webs interconnecting the inner and outer concentric annular members 18 and 20. Since all of the vibratory forces between the motor and the mount are caused to pass from one concentric ring to the other through the spaced pairs of members or webs 26, 28, maximum advantage is taken of the inherent resiliency of the plastic material. Thus, the connecting members or webs 26 and 28 serve not only to position the annular members 18 and 20 respectively to each other so that the hub is at all times functionally placed in its proper position, but they also serve to suppress vibrations which develop objectionable noise and also tend to reduce the effective life of the motor.

Figure 3:
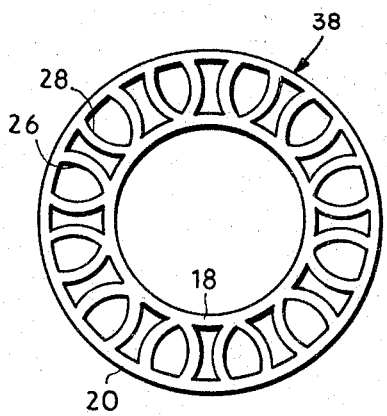
FIGURE 3 is a side elevation view of a mounting structure constituting a further embodiment of the present invention and looking in the same direction as the mounting structure of FIGURE 2.

Referring next to the embodiment of FIGURE 3, the spaced pairs of connecting members or webs 26 and 28 may be spaced closer together to increase the strength of the connection between the inner and outer concentric annular members 18 and 20. For example, there may be 12 pairs of members in FIGURE 3 as compared with 7 pairs of members in the embodiment of FIGURE 2. The selection of the desired number of pairs of connecting webs is a matter of how strong the connection is required between the mounting bracket and motor. The general relationship is that the heavier the motor and greater the speed and torque characteristics of the motor, the greater will be the requirement for added strength in the mounting structure 38 and hence the greater number of pairs of webs.

In this embodiment of FIGURE 3 as in the previous embodiment, the webs are formed integrally with the inner and outer concentric annular members and at their opposite ends are merged into the confronting surfaces of said annular members. The entire structure can be made by molding operation whereby the structure is of a one-piece construction. The described construction permits resilient relative movement of the motor parts not only circumferentially but axially as well, and this contributes to damping of any objectionable sounds that tend to develop within the motor.

Figure 4:
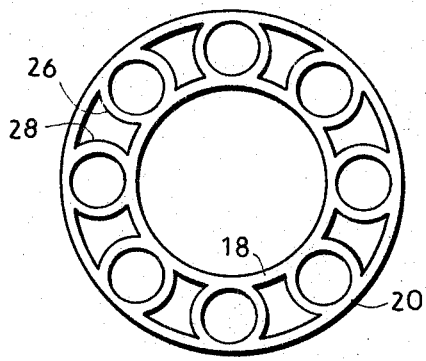
FIGURE 4 is a further embodiment of the invention viewed in the same direction as that of FIGURE 3 and illustrating a further arrangement of the connecting elements between the inner and outer concentric members; and, FIGURES 5 and 6 are further embodiments showing other arrangements for the connecting elements between the inner and outer concentric members.

Referring next to the embodiment of FIGURE 4, the pairs of webs 26, 28 can be curved so that their opposite ends bent toward one another so that the cross section of the webs are approximately circular. This construction is useful, particularly in resisting axially directed thrust loads.

Figure 5:
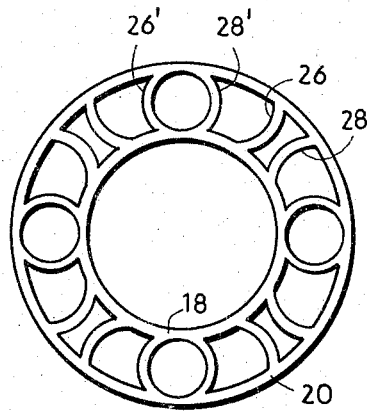

Referring next to the embodiment of FIGURE 5, alternate ones of the circumferentially spaced pairs are arranged so that alternate pairs correspond with FIGURES 3 and 4 respectively. Thus, the pairs of webs 28, 26 correspond with the configuration of FIGURE 3 and the other pairs 26' and 28' correspond with the construction of FIGURE 4. Thus, the resulting construction embodies the characteristics of both FIGURES 3 and 4.

Figure 6:
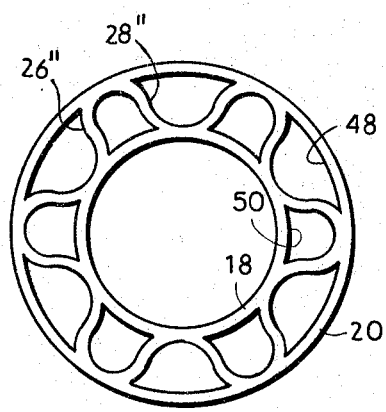

In a still further embodiment of the invention, shown in FIGURE 6, the web may be formed continuously, as a scalloped configuration with curved portions 26" and 28" curving alternately between and tangent with the confronting surfaces 48, 50 of the concentric annular members 18 and 20 respectively.

The scalloped construction, reinforces the two annular members against movement one relatively to the other while at the same time also permitting the resilient cushioning effect the same as in the previous embodiments, which has the effect of damping noise.

The foregoing embodiments each have in common the fact that the motor is substantially noise free in operation or at least is reduced to a very low noise level.

Although the present invention has been illustrated and described in connection with certain selected example embodiments, it will be understood that these are illustrative of the invention and are by no means restrictive thereof. It is reasonably to be expected that those skilled in this art can make numerous revisions and adaptations of the invention to suit individual design preferences and it is intended that such revisions and adaptations which incorporate the herein disclosed principles will be included within the scope of the following claims, as equivalents of the invention.

What is claimed is:

1. A resilient motor mounting comprising two annular members having confronting cylindrical surfaces and defining an annular spacing therebetween, a plurality of spaced force-transmitting members disposed at circumferentially spaced intervals and disposed within said annular spacing and joined at the opposite ends thereof with said annular members, said force-transmitting members being in circumferentially spaced arcuate pairs which are curved in opposite directions to provide force-transmitting connections which cushion the transmission of force between said inner and outer annular members and thereby provide a lessening of the torque forces transmittable between said inner and outer annular members.

2. A resilient motor mounting comprising two annular members having substantially the same radial thickness and having confronting surfaces defining an annular spacing therebetween, a plurality of spaced force-transmitting members of substantially the same thickness as the said radial thickness of said annular members and extending between and joined at the opposite ends thereof with said annular members respectively, said force-transmitting members being circumferentially spaced arcuate pairs forming oppositely curved force-transmitting connections which cushion the transmission of force between said inner and outer annular members.

3. A resilient motor mounting comprising two annular members having confronting cylindrical surfaces defining an annular spacing therebetween, a plurality of spaced pairs of force-transmitting members extending between and joined at the opposite ends thereof with said annular members, said force-transmitting members being curved whereby each pair is provided with ends having sections which converge as they join with the inner of said cylindrical surfaces and diverge at their radially outward ends having connections with the cylindrical surface of the outer of said two annular members, said two annular members being thereby connected together through said force-transmitting members which are yieldable to cushion the transmission of vibratory forces between said inner and outer annular members.

4. A resilient motor mounting comprising two annular members having confronting cylindrical surfaces and defining an annular spacing therebetween, a plurality of spaced force-transmitting members having a substantially constant thickness and an arcuate shape, and joined at the opposite ends respectively with said annular members, adjacent ones of said force-transmitting members converging through at least a portion of the length thereof, said force-transmitting members being of yieldable construction to provide a cushioned transmission of force between said inner and outer annular members respectively.

5. A resilient motor mounting comprising two annular members having confronting cylindrical surfaces defining an annular spacing therebetween, a plurality of spaced smoothly curving force-transmitting members extending between and joined at the opposite ends thereof with said annular members and disposed in pairs around the circumferential spacing between said annular members, corresponding elements of alternate pairs of said force-transmitting members converging respectively at the ends thereof and at the midportions thereof to provide resilient cushioned force transmission between said annular members.

6. A resilient motor mounting for being carried by a support structure and for receiving the shaft of a motor or the like, comprising two concentric annular members, the inner of said annular members being adapted to receive said shaft for mounting therein and the outer of said annular members being adapted to be carried by said support structure, a connecting member formed as a scalloped continuous structure extending between and joined tangentially to the confronting surfaces of said concentric annular members, said connecting member being formed as a plurality of oppositely bending continuous sections which are joined at circumferentially spaced points to said inner and outer annular members to transmit cushioned forces therebetween.

References Cited

UNITED STATES PATENTS 2,322,193   6/1943   Kaemmerling _____ 248—358
2,756,013   7/1956   Cunningham _____ 248—26
3,065,941   11/1962  Loftis _____ 248—26

OTHER REFERENCES

Ser. No. 304,633, Julien (A.P.C.), published May 1943; abandoned. 248–358.

JOHN PETO, *Primary Examiner.*

CLAUDE A. LE ROY, *Examiner.*